United States Patent [19]
Nishikawa

[11] Patent Number: 5,812,253
[45] Date of Patent: Sep. 22, 1998

[54] MEASURING APPARATUS FOR OPTICAL FIBER AMPLIFIER AND ADJUSTMENT METHOD FOR THE SAME

[75] Inventor: Tomoyuki Nishikawa, Tokyo, Japan

[73] Assignee: Ando Electric Co., Ltd., Tokyo, Japan

[21] Appl. No.: 820,340

[22] Filed: Mar. 12, 1997

[30] Foreign Application Priority Data

Mar. 27, 1996 [JP] Japan .................................. 8-072925

[51] Int. Cl.⁶ .................................................. G01N 21/84
[52] U.S. Cl. ........................................................... 356/73.1
[58] Field of Search ............................................ 356/73.1

[56] References Cited

U.S. PATENT DOCUMENTS 5,521,751   5/1996   Aida et al. .............................. 359/337

*Primary Examiner*—Vincent P. McGraw
*Attorney, Agent, or Firm*—Finnegan, Henderson, Farabow, Garrett & Dunner, L.L.P.

[57] ABSTRACT

A measuring apparatus and a method of operation are presented for rapid and accurate determination of the performance parameters of an optical fiber amplifier. The apparatus primarily includes an optical fiber path 2 having an acousto-optical modulator 3 for modulating reference light and an optical switching device 11 for enabling to bypass the modulator 3, to supply reference light to an optical coupler 5 which divides the reference light into first and second signals. The measuring technique involves: a first step of bypassing the modulator 3 to measure the power level of the second optical signal with an optical powermeter 10; a second step of measuring the power level of the modulated reference light, and then selecting a second optical signal with an optical switch 7 for modulation in another acousto-optical modulator 8, and measuring its output signal; a third step of bypassing the modulator 3 so as to measure the output signal from the modulator 8 with an optical spectrum analyzer 9; a fourth step of measuring the power level of the modulated reference light; and a fifth step of computing a difference between the measured results in steps 1 and 3 to obtain an adjustment value for the reference light, and computing a difference between the measured results in steps 2 and 4 to obtain an adjustment value for the modulated light.

10 Claims, 5 Drawing Sheets

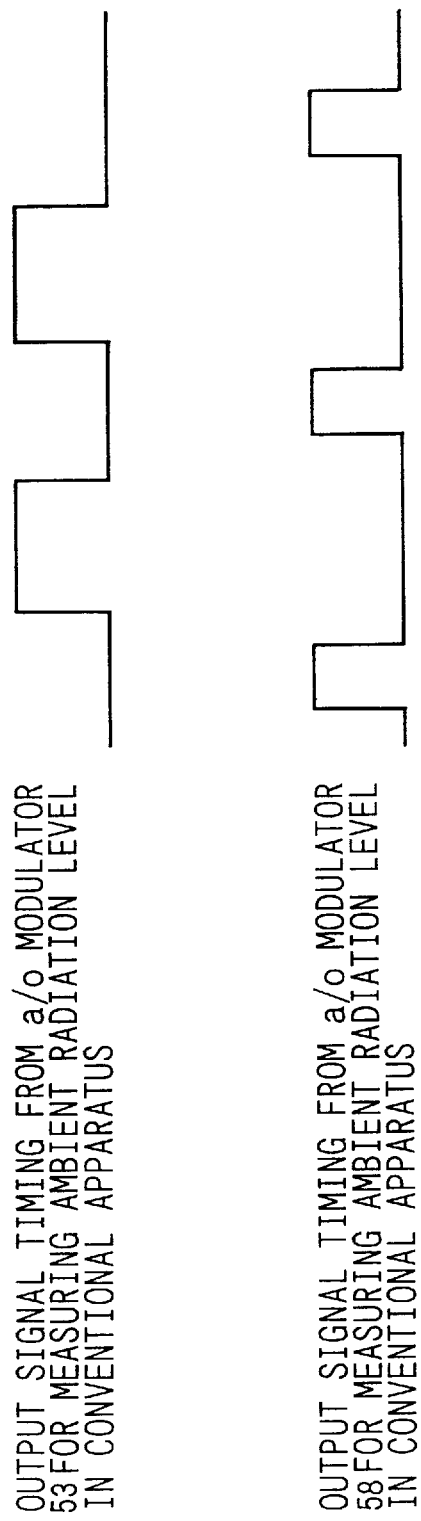

MEASURING APPARATUS FOR OPTICAL FIBER AMPLIFIER AND ADJUSTMENT METHOD FOR THE SAME

BACKGROUND OF THE INVENTION

1. Field of the Invention

The present invention relates to a measuring apparatus for determining the operational characteristics of an optical fiber amplifier, and a method of adjusting the operational parameters of the apparatus.

2. Description of the Related Art

FIG. 3 is a schematic block diagram of a conventional measuring apparatus for determining the operational characteristics of an optical fiber amplifier. Output light from a light source 51 is input into an acousto-optical modulator 53 through a fiber optic path 52. In this drawing, it should be noted that the modulator 53 receives other input signals (such as low frequency acoustic signals), but such non-essential details will neither be shown in the drawing nor explained here.

Also, an optical connector 54 is inserted in the mid-section of the fiber optic path 52, but explanations for this and other non-essential components which may appear in the following descriptions will be omitted.

An output optical signal given a certain degree of modulation by the acousto-optical modulator (shortened to a/o modulator hereinbelow) 53 is divided through an optical coupler 55 into two optical signals, a first optical signal and a second optical signal, having an optical power ratio of 1:1. Of the two signals, the second signal is input into the optical fiber amplifier (shortened to o/f amplifier hereinbelow) 56 to some given optical gain.

Both the first optical signal and the second signal which has been amplified in the o/f amplifier 56 are both input into an optical switch 57. The first optical signal is input indirectly into an input terminal $57_{-1}$ of the optical switch 57 while the second optical signal which has been amplified by the o/f amplifier 56 is input into an input terminal $57_{-2}$.

The optical switch 57 selects either the signal input into the input terminal $57_{-1}$ or the signal input into the input terminal $57_{-2}$ and outputs the selected signal from an output terminal $57_{-3}$.

The optical signal output from the optical switch 57 is input into the a/o modulator 58, and is output with a given degree of modulation. Other signals to be modulated are also input into the a/o modulator 58, but such non-essential details and explanations are omitted.

An optical spectrum analyzer 59 is provided to measure the optical power in each of the sections noted above. Also, a reference signal powermeter 60 is used for adjusting the optical spectrum analyzer 59.

Next, the steps for adjusting the o/f amplifier will be explained. The optical spectrum analyzer 59 determines the power levels of an optical power $P_{in}$ input into the o/f amplifier 56, an optical power $P_{out}$ output from the o/f amplifier 56 and optical power of the ambient radiation $P_{ase}$ output from the o/f amplifier 56.

FIG. 4 shows timing graphs for the optical signals output from the a/o modulator 53 and the optical signals output from the a/o modulator 58.

As shown by these graphs, the power levels of the optical power $P_{in}$ and output optical power $P_{out}$ are determined by measuring the power levels, respectively, before and after inputting of output power from the light source 51 into the o/f amplifier 56 by synchronizing the phases of the two output signals from the a/o modulators 53, 58.

Furthermore, when measuring the signal power $P_{in}$, the input terminal $57_{-1}$ and the output terminal $57_{-3}$ of the optical switch 57 are connected, and when measuring the signal power $P_{out}$, the input terminal $57_{-2}$ and the output terminal $57_{-3}$ of the optical switch 57 are connected, and the respective output power levels are measured with the optical spectrum analyzer 59.

FIG. 5 shows the timing graphs, in the case of measuring the output power of the ambient radiation $P_{ase}$, for the optical signals output from the a/o modulators 53 and 58.

As shown in these timing graphs, the phase relationships of the a/o modulator 53 and the a/o modulator 58 are inverted for measuring the optical power of the ambient radiation. This arrangement is adopted because the optical power of the ambient radiation $P_{ase}$ relates to the power level of the natural radiation component (continuous light) which is characteristic to the o/f amplifier 56, and therefore, it is necessary that this quantity be measured under a condition of no input of signal power into the o/f amplifier 56.

It is seen, therefore, that the ambient radiation power $P_{ase}$ is determined by optical spectrum analyzer 59 under the condition of no optical signal input into the o/f amplifier 56.

After the completion of the measurement process of the optical powers Pin, Pout and Pase, the gain G and noise factor NF of the o/f amplifier 56 are obtained according to the following relation:

$$G = (Pout - Pase)/Pin \quad (1)$$

$$NF = (Pase/h \cdot v \cdot G \cdot vv) + (1/G) \quad (2)$$

where h is the Planck constant, v is the optical frequency of an optical signal and vv is the resolution limit of the optical spectrum analyzer 59.

It is known that the accuracy of determination of optical powers by the optical spectrum analyzer 59 affects the determination of the gain G and noise factor NF of the o/f amplifier 56. For this reason, to provide results of high accuracy, it is necessary to adjust the output power level of the optical spectrum analyzer 59 by using the reference powermeter 60.

The adjusting steps are as follows. First, the optical power of the input signal to the o/f amplifier 56 is measured with the optical spectrum analyzer 59, and the same input signal is measured with the reference optical powermeter 60 to produce a difference between the two measurements, and is stored in memory as an adjustment parameter.

When the actual measurement of the o/f amplifier 56 is to be carried out, the readings of gain G and noise factor NF obtained with the optical spectrum analyzer 59 are modified by considering the adjustment parameter obtained in the above step.

In other words, to determine the output power levels of the modulated optical signals obtained by modulating the output light from the optical source 51 with the a/o modulator 53, it is necessary that the optical powers Pin, Pout be measured, using both the reference optical powermeter 60 and the optical spectrum analyzer 59, at the time of the adjustment step.

In the meanwhile, to determine the power level Pase of the ambient radiation (continuous light) contained in the output signal from the o/f amplifier 56, the value of Pase is measured, the power level of the continuous light is measured again using both the reference optical powermeter 60 and the optical spectrum analyzer 59, at the time of the adjustment step.

For this adjustment step in the measuring process, the a/o modulator 53 is first placed in a modulation condition to generate modulated light from the a/o modulator 53 and then to measure the power levels Pin, Pout of the optical signals with the use of the reference optical powermeter 60 and the optical spectrum analyzer 59.

After this step is completed, the a/o modulator 53 is placed in a standby mode (non-modulation), and the power level of the ambient radiation Pase is measured using the continuous light output from the a/o modulator 53 with the reference powermeter 60 and the optical spectrum analyzer 59.

In following the above sequence of events, it should be noted that the a/o modulator 53 or 58 has an operational characteristic that when the modulation condition is altered, it requires several minutes before the signal loss between the input and output terminals becomes stabilized. For this reason, in order to obtain accurate values of the adjustment parameters, it is necessary to provide a waiting period lasting several minutes between switching of modulation conditions.

Furthermore, after the completion of the system adjustment step, measurements of the actual power levels are carried out by activating both a/o modulators 53, 58, and it is necessary again to provide a waiting period, for the stabilization of the a/o modulators 53, 58, before proceeding from the adjustment step to actual power measurement step.

Therefore, the existing apparatuses are not only cumbersome and inefficient from the point of the user, but also present an operational problem that the accuracy of determinations may seriously be affected when it is necessary to repeatedly perform the processes of adjustment and power measurements. There has been a need to develop an apparatus to facilitate optical power measurements and provide highly accurate results of power measurement quickly and efficiently.

SUMMARY OF THE INVENTION

It is an object of the present invention to present a measuring apparatus which provides a stable operation under conditions of altering modulation, and a quick determination of the operational characteristics of an optical fiber amplifier.

The object has been achieved in a measurement apparatus for determining operational parameters of an optical fiber amplifier comprising: a light source for generating reference light for inputting into an optical fiber amplifier to be evaluated; an optical coupler for dividing the reference light into a first optical signal and a second optical signal; a first optical measuring means for measuring the second optical signal; a fiber optic path for transmitting the reference light to the optical coupler; a first optical modulation means inserted in the fiber optic path for modulating the reference light; a first optical switch, having dual optical paths, for selecting either to provide modulation to the reference light or to bypass the first optical modulation means while maintaining a standby state of the first optical modulation means; a second optical switch, having a single optical path, for alternatively choosing either the first optical signal or the second optical signal which has been amplified by the optical fiber amplifier; a second modulation means for providing modulation either to the first optical signal or to the second optical signal; and a second optical measurement means for measuring optical signal output from the second modulation means.

According to the apparatus presented, the need for successive inputting of an optical signal into an optical spectrum analyzer and then into the optical powermeter has been greatly reduced for determining the performance of an optical fiber amplifier, with the consequence that the need for waiting time for stabilization of the measuring devices has been eliminated. The advantage of the process is the same for the measurement of ambient radiation power with and without modulation of the reference light. Even when the modulators are switched from an operating to a standby state, there is no need to wait for stabilization of the modulators.

An aspect of the apparatus is that the first optical measurement means includes an optical powermeter.

Another aspect of the apparatus is that the second optical measurement means includes an optical spectrum analyzer.

Another aspect of the apparatus is that the first modulation means includes an acousto-optical modulator.

Final aspect of the apparatus is that the second modulation means includes an acousto-optical modulator.

It is another object of the present invention to provide a method of operating the apparatus so that adjustment parameters can be obtained quickly and efficiently to define the operational characteristics of the apparatus.

The method comprises the steps of: a first step of measuring the second optical signal with a first optical measuring means while bypassing the first modulation means through the first optical switch; a second step of providing modulation to the reference light using the first modulation means and measuring the second optical signal transmitted through the first optical switch with the first optical measuring means; a third step of inputting the second optical signal, which has been amplified in the optical fiber amplifier, through the second optical switch into the second modulation means, and measuring the second optical signal output from the second modulation means while the first modulation means is being bypassed in the first optical switch; a fourth step of providing modulation to the reference light transmitted through the first optical switch using the first modulation means, and measuring the second optical signal output from the second modulation means using the second measuring means; and a fifth step of computing an adjustment value for continuous light based on a difference in measurement results obtained in the first step and the third step, and computing an adjustment value for modulated light based on a difference in measurement results obtained in the second step and the fourth step.

An aspect of the method is that the first measuring means includes an optical powermeter.

Another aspect of the method is that the second measuring means includes an optical spectrum analyzer.

Another aspect of the method is that the first modulation means includes an acousto-optical modulator.

Final aspect of the method is that the second modulation means includes an acousto-optical modulator.

According to the present method, the optical path of the apparatus includes all the essential components, as disclosed in claim 1, with modulation or without modulation, thus being able to produce a first optical signal and a second optical signal. In the first step, the first switch is set so that the first modulator is bypassed and unmodulated light is measured in the first measuring device which may be an optical powermeter to determine the basic output power level of the continuous reference light. In the second step, the reference light is modulated in the first modulation device, and the second signal is then measured with the first measuring device. In the third step, the first modulation device is bypassed and the second optical signal is measured with the second measuring device which in this case may be a spectrum analyzer to determine the respective parameters of various wavelengths components therein. In the fourth step, the reference light is modulated with the first modulation device and the output signal from the second modulation device is measured with the second measuring device which may be a spectrum analyzer. In the final step, the difference in the measured results produced in steps 1 and 3 is computed to obtain an adjustment value for the continuous light while the difference in the measured results produced in steps 2 and 4 is computed to obtain an adjustment value for the modulated light.

It is clear that the present apparatus and the method disclosed are superior to the conventional apparatus and its associated techniques, because of the excellent stability in the performance of the apparatus during standardization as well as measurements processes, and because of the fact that the operational parameters of an optical fiber amplifier can be corrected quickly and efficiently with little chances for making systemic errors in the measurement process.

BRIEF DESCRIPTION OF THE DRAWINGS

FIG. 5 is an example of the timing used in conventional optical fiber amplifier to measure Pase, of ambient radiation output, respectively, from an acousto-optical modulator 53 (top) and another acousto-optical modulator 58 (bottom).

DESCRIPTION OF THE PREFERRED EMBODIMENTS

The following description is divided into two sections: first section deals with the configuration of the o/f amplifier and second section deals with the method of obtaining the parameters for adjustment of the measured values.

A. Configuration of the Optical Fiber Amplifier

Figure 1:
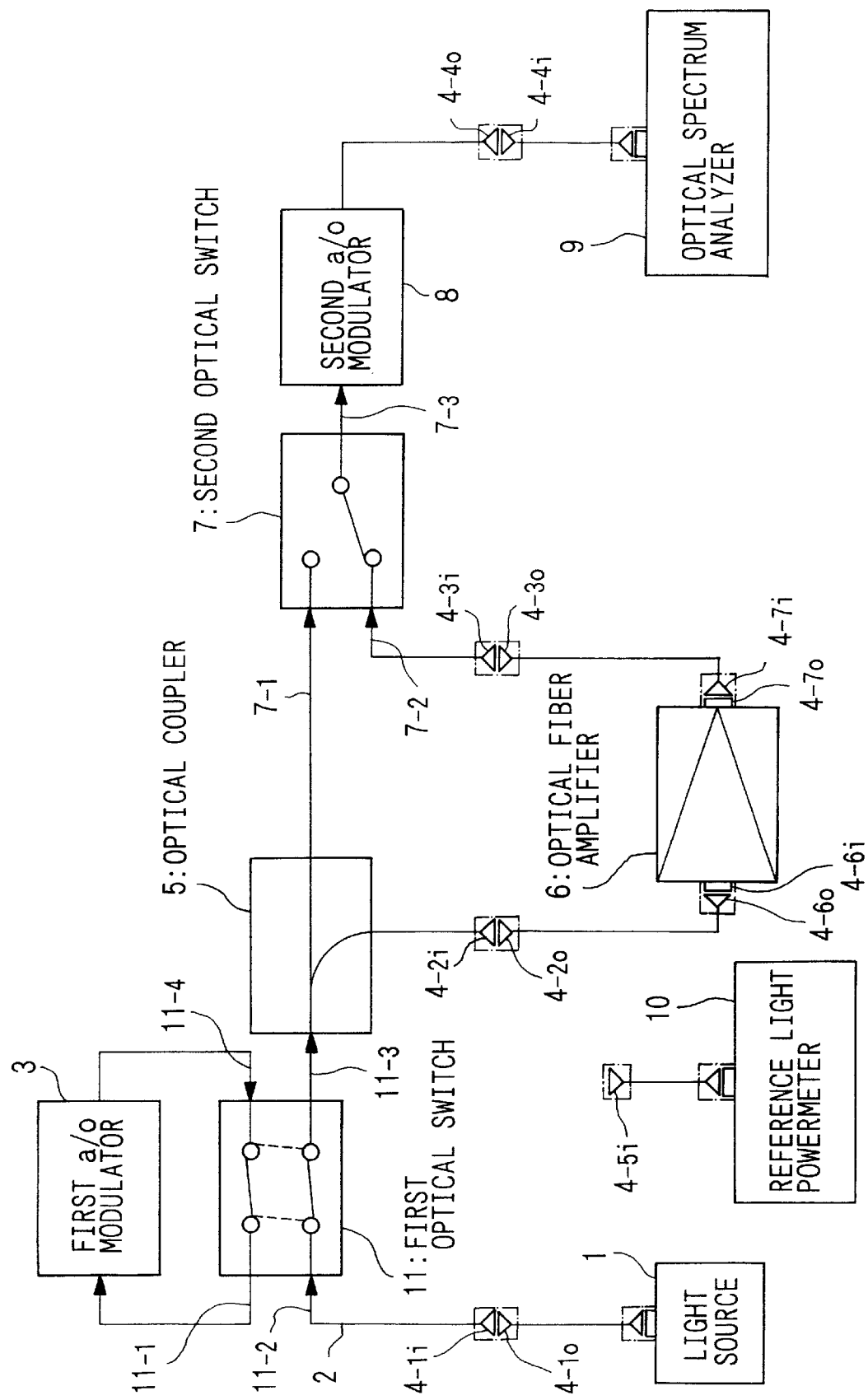
FIG. 1 is a schematic block diagram of a first embodiment of the measuring apparatus for the optical fiber amplifier of the present invention.

With reference to FIG. 1 which is a block diagram of the measuring apparatus for an optical fiber amplifier.

In FIG. 1, output light from a light source 1 is input into a terminal $11_{-2}$ of an optical switch 11 through a fiber optic path 2 having optical connectors $4_{-1i}$, $4_{-1o}$. All the optical signals which will be discussed below are transmitted through the fiber optic path 2, but detailed explanations of non-essential signals will be omitted.

The optical switch 11 is provided with four terminals, $11_{-1}$, $11_{-2}$, $11_{-3}$ and $11_{-4}$ and is able to choose one of dual optical paths: by connecting terminals $11_{-1}$ to $11_{-4}$ and terminals $11_{-2}$ to $11_{-3}$ (shown in FIG. 1 by solid lines); or terminals $11_{-1}$ and $11_{-2}$ to terminals $11_{-3}$ and $11_{-4}$ (shown in FIG. 1 by dotted lines).

An a/o modulator 3 is inserted between the terminals $11_{-1}$ and $11_{-4}$ to provide a certain degree of modulation to an optical signal output therefrom. It should be noted that, though not shown in the drawing, other modulation signals (for example, low frequency acoustic signals) are also processed by the modulator 3.

An optical signal output from the terminal $11_{-3}$ of the optical switch 11 is divided into two optical signals, by an optical coupler 5 so that the output powers are in a ratio of 1:1. The second optical signal is input into the o/f amplifier 6 through the input and output optical connectors $4_{-2i}$ and $4_{-2o}$, and is amplified to provide a certain value of gain. The first optical signal output by the optical coupler 5 is input directly into an input terminal $7_{-1}$. The second optical signal which has been amplified in the o/f amplifier 6 is input into another input terminal $7_{-2}$, through the input and output optical connectors $4_{-3i}$, $4_{-3o}$.

The optical switch 7 selects one of either the first or second optical signal input respectively to input terminal $7_{-1}$ or $7_{-2}$, and outputs the selected optical signal from the output terminal $7_{-3}$.

The optical signal output from the optical switch 7 is input into the a/o modulator 8, and is output at a certain modulation intensity. The a/o modulator 8 receives other optical signals also, but they are omitted to simplify the explanation for the signal transmission process.

An optical spectrum analyzer 9 is used to measure optical powers in the various sections described above, and in FIG. 1, the optical spectrum analyzer 9 is connected to the a/o modulator 8 through input and output optical connectors $4_{-4i}$, $4_{-4o}$.

A reference optical powermeter 10 is used to adjust the operational parameters of the optical spectrum analyzer 9.

B. Method of Adjustments

Figure 2:
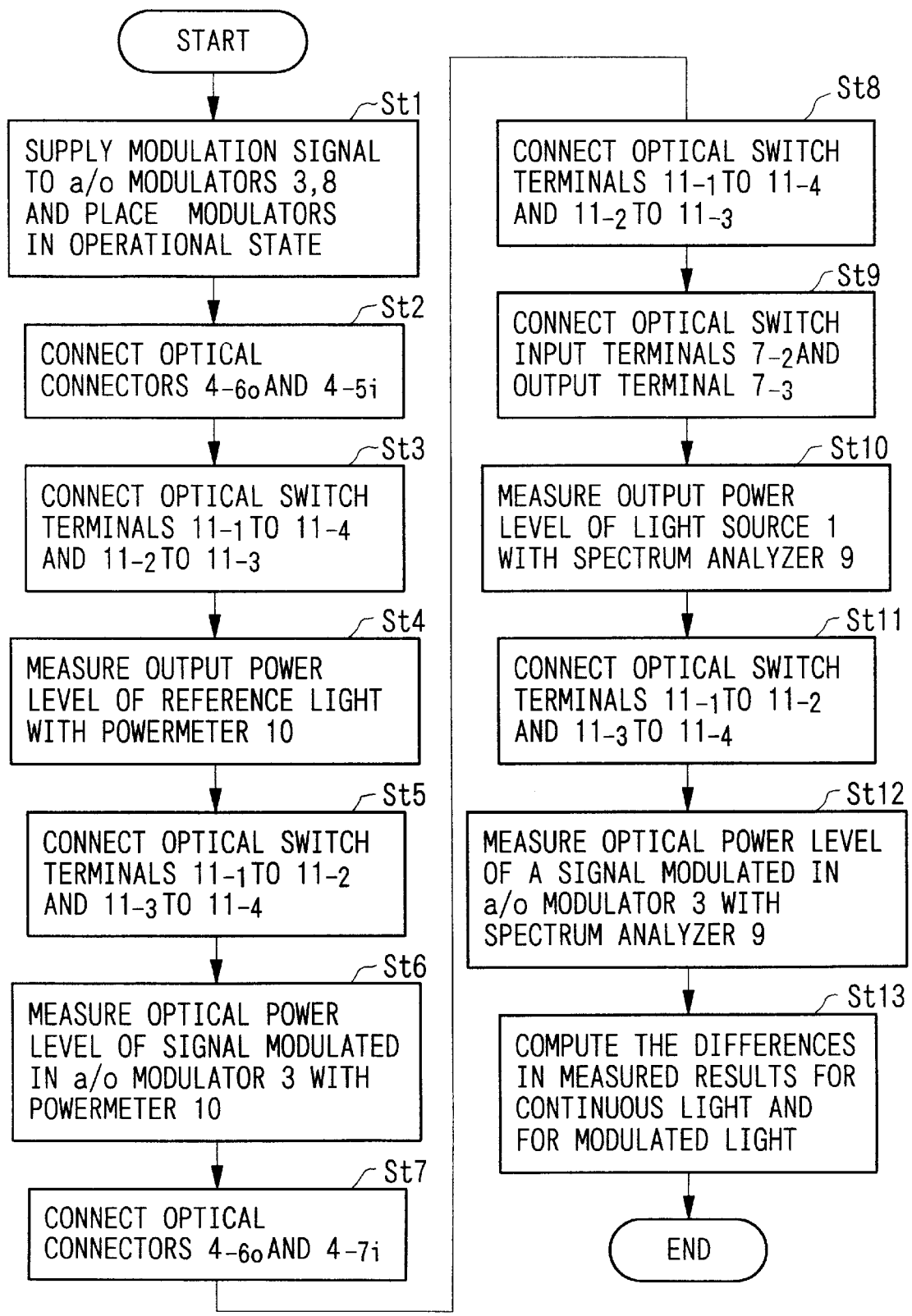
FIG. 2 is a flowchart to explain the adjustment steps for the optical fiber amplifier.
Figure 3:
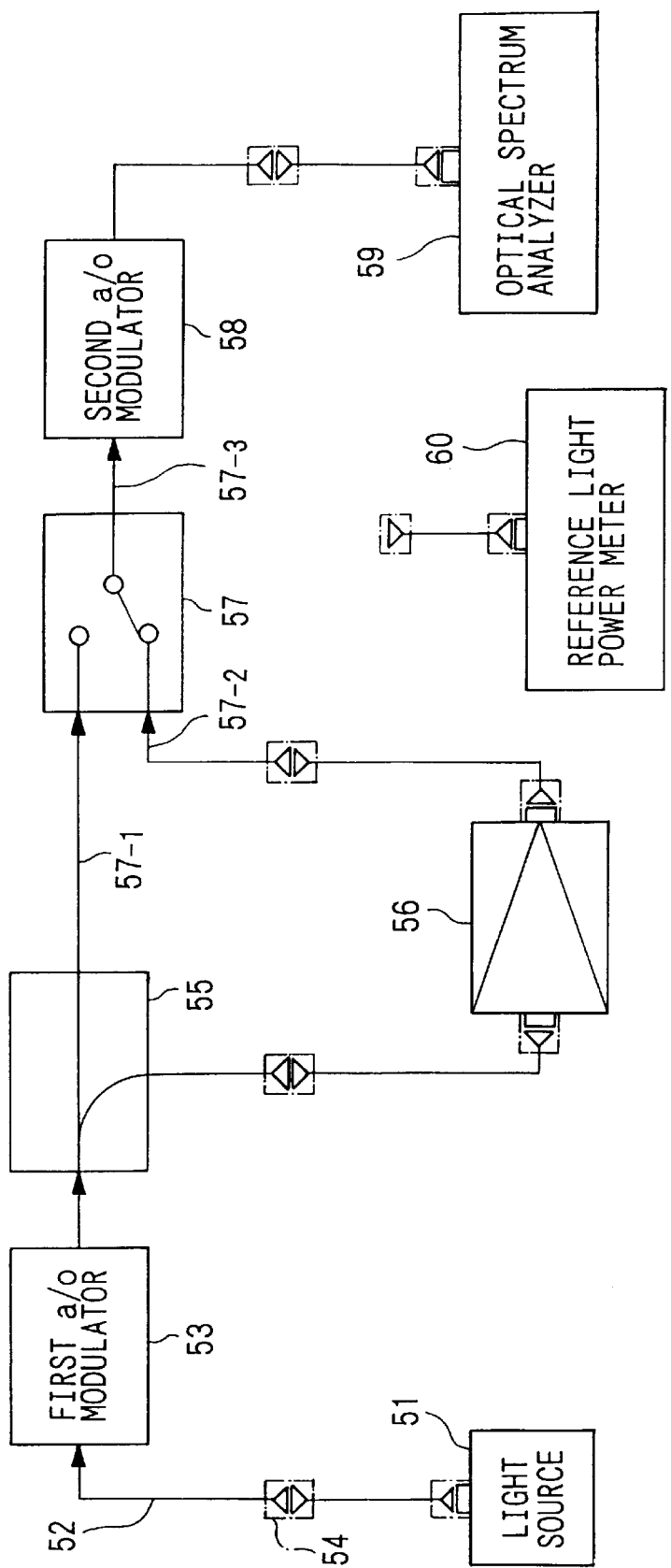
FIG. 3 is a schematic block diagram of a conventional optical fiber amplifier.

An example of the method of adjustment for the measuring apparatus for the optical fiber amplifier shown in FIG. 1 will be explained, with reference to FIG. 2 which is a flowchart of the adjustment steps.

First, the a/o modulators 3, 8 are placed in modulation state, and optical signals are supplied to be modulated (step St1).

Next, optical connectors $4_{-6o}$ and $4_{-5i}$ are connected together to input an optical signal from the optical coupler 5 to the reference optical powermeter 10 (step St2).

In the next step, the optical switch 11 connects terminals $11_{-1}$ and $11_{-4}$ and terminals $11_{-2}$ and $11_{-3}$ (step St3) so that the optical power of continuous light output from the light source 1 can be measured with the optical powermeter 10 (step St4).

Next, the optical switch 11 can connect the terminals $11_{-1}$ and $11_{-2}$ and the terminals $11_{-3}$ and $11_{-4}$ (step St5) so that the optical power of modulated signals can be measured by the reference optical powermeter 10 (step St6).

At this time, the optical connectors $4_{-6o}$, $4_{-7i}$ are connected so as to input a portion of the optical signal modulated by the a/o modulator 3 into the input terminal $7_{-2}$ of the optical switch 7 (step St7).

In the next step, the terminals $11_{-1}$ to $11_{-4}$ and $11_{-2}$ to $11_{-3}$ of the optical switch 11 are connected (step St8) as well as the input and output terminals $7_{-2}$, $7_{-3}$ are connected (step St9) thereby bypassing the a/o modulator 3.

In this condition, the optical power of continuous light output from the light source 1 is measured with the optical spectrum analyzer 9 (step St10).

Next, the terminals $11_{-1}$ to $11_{-2}$ and the terminals $11_{-3}$ to $11_{-4}$ are connected (step St11), and the power of optical signals modulated by a/o modulator 3 is measured (step St12).

Lastly, a difference in the optical signal powers measured in step St4 and in step St10 is computed, and the result is taken as the adjustment parameter for the continuous light, and a difference in the optical signal powers measured in step St6 and in step St12 is computed, and the result is taken as the adjustment parameter for modulation light (step St13).

Subsequently, although not shown in the drawing, the input terminal $7_{-1}$ and the output terminal $7_{-3}$ are connected together, and an optical signal power Pin is measured with the optical spectrum analyzer 9, and then the input terminal $7_{-2}$ and the output terminal $7_{-3}$ are connected together, and an optical signal power Pout is measured with the optical spectrum analyzer 9.

Figure 4:
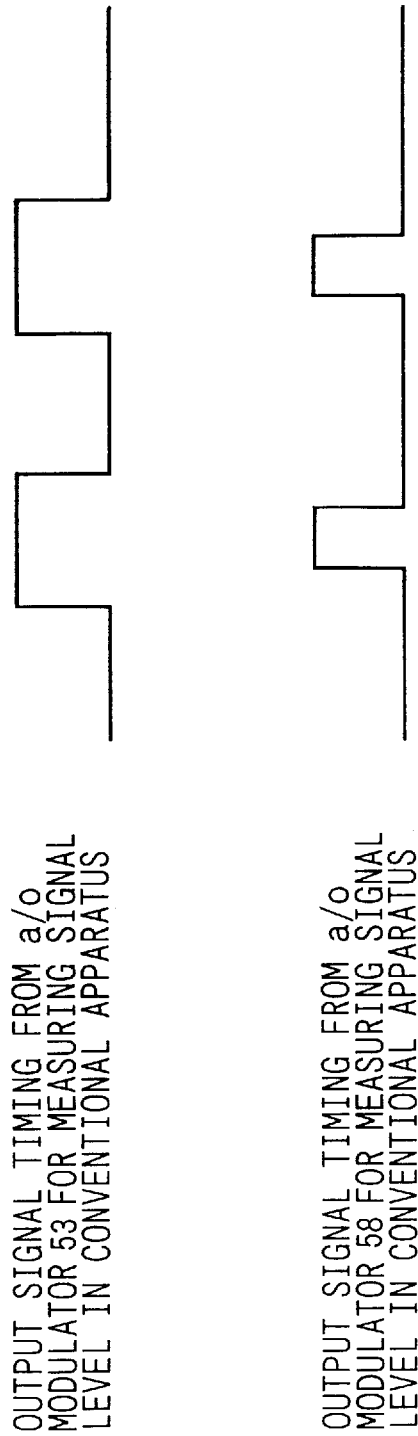
FIG. 4 is an example of the timing used in conventional optical fiber amplifier to measure Pin and Pout, of optical signals output, respectively, from an acousto-optical modulator 53 (top) and another acousto-optical modulator 58 (bottom).

In this case, the optical signal output from the a/o modulator 3 and the optical signal output from the a/o modulator 8 are in phase, as illustrated in FIG. 4, and when measuring the ambient radiation power Pase, the optical signals are inverted as illustrated in FIG. 5.

After thus obtaining the values of the optical powers Pin, Pout and Pase, the gain G and the noise factor NF in accordance with equations (1) and (2), and using the adjustment parameters obtained in step St13.

As explained above, according to the embodiment of the measuring apparatus of the present invention, the need to wait for the acousto-optical modulators to become stabilized has been eliminated during the period of altering the modulation conditions, thus enabling to shorten the time requirement for adjustment process, as well as to improve the accuracy of the measurement process so that correct results can be obtained quickly and efficiently.

What is claimed is:

1. A measurement apparatus for determining operational parameters of an optical fiber amplifier comprising:

a light source for generating reference light for inputting into an optical fiber amplifier to be evaluated;

an optical coupler for dividing said reference light into a first optical signal and a second optical signal;

a first optical measuring means for measuring said second optical signal;

a fiber optic path for transmitting said reference light to said optical coupler;

a first optical modulation means inserted in said fiber optic path for modulating said reference light;

a first optical switch, having dual optical paths, for selecting either to provide modulation to said reference light or to bypass said first optical modulation means while maintaining a standby state of said first optical modulation means;

a second optical switch, having a single optical path, for alternatively choosing either said first optical signal or said second optical signal which has been amplified by said optical fiber amplifier;

a second modulation means for providing modulation either to said first optical signal or to said second optical signal; and a second optical measurement means for measuring optical signal output from said second modulation means.

2. A measuring apparatus as claimed in claim 1, wherein said first optical measuring means comprises an optical powermeter.

3. A measuring apparatus as claimed in claim 1, wherein said second optical measuring means comprises an optical spectrum analyzer.

4. A measuring apparatus as claimed in claim 1, wherein said first modulation means comprises an acousto-optical modulator.

5. A measuring apparatus as claimed in claim 1, wherein said second modulation means comprises an acousto-optical modulator.

6. A method for adjusting results of measurements of operational parameters of an optical fiber amplifier obtained with an optical measuring apparatus, disposed in a fiber optic path, comprising a first modulation means for modulating reference light and a first optical switch for choosing either to modulate reference light or to bypass the first modulation means while holding the first modulation means in a standby state, an optical coupler for dividing reference light into a first optical signal for through transmission and a second optical signal for input into said optical fiber amplifier, and a second optical switch for alternatively choosing either said first optical signal or said second optical signal, comprising the steps of:

a first step of measuring said second optical signal, before passing through said optical fiber amplifier, with a first optical measuring means while bypassing said first modulation means through said first optical switch;

a second step of providing modulation to said reference light using said first modulation means and measuring said second optical signal, before passing through said optical fiber amplifier, transmitted through said first optical switch with said first optical measuring means;

a third step of inputting said second optical signal, which has been amplified in said optical fiber amplifier, through said second optical switch into a second modulation means, and measuring the second optical signal output from said second modulation means using a second optical measuring means while said first modulation means is being bypassed in said first optical switch;

a fourth step of providing modulation to said reference light transmitted through said first optical switch using said first modulation means, and measuring said second optical signal output from said second modulation means using said second optical measuring means; and a fifth step of computing an adjustment value for continuous light based on a difference in measurement results obtained in said first step and said third step, and computing an adjustment value for modulated light based on a difference in measurement results obtained in said second step and said fourth step.

7. A measuring apparatus as claimed in claim 6, wherein said first optical measuring means comprises an optical powermeter.

8. A measuring apparatus as claimed in claim 6, wherein said second optical measuring means comprises an optical spectrum analyzer.

9. A measuring apparatus as claimed in claim 6, wherein said first modulation means comprises an acousto-optical modulator.

10. A measuring apparatus as claimed in claim 6, wherein said second modulation means comprises an acousto-optical modulator.

* * * * *